US012281624B1

(12) United States Patent
Srinivas et al.

(10) Patent No.: US 12,281,624 B1
(45) Date of Patent: Apr. 22, 2025

(54) ELECTRONIC COMPRESSOR FOR REDUCTION OF COLD START EMISSION AND NOISE VIBRATION AND HARSHNESS

(71) Applicant: FCA US LLC, Auburn Hills, MI (US)

(72) Inventors: Pavan Kumar Mukkara Srinivas, Troy, MI (US); Ronald A Reese, II, Goodrich, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/476,489

(22) Filed: Sep. 28, 2023

(51) Int. Cl.
*F02D 41/06* (2006.01)
*F02B 39/10* (2006.01)
*F02D 41/00* (2006.01)

(52) U.S. Cl.
CPC ............ *F02D 41/064* (2013.01); *F02B 39/10* (2013.01); *F02D 41/0007* (2013.01); *F02D 2200/0406* (2013.01)

(58) Field of Classification Search
CPC ........ F02D 41/06; F02D 41/064; F02D 41/00; F02D 41/0007; F02B 39/10
See application file for complete search history.

(56) References Cited

U.S. PATENT DOCUMENTS

| | | | | |
|---|---|---|---|---|
| 6,062,026 | A * | 5/2000 | Woollenweber | F02M 26/08 60/605.2 |
| 9,850,831 | B2 * | 12/2017 | Ossareh | F02D 11/02 |
| 9,874,191 | B2 * | 1/2018 | Xiao | F02N 11/0829 |
| 10,301,991 | B1 * | 5/2019 | Dudar | F02M 35/1038 |
| 2017/0022954 | A1 * | 1/2017 | Xiao | F02B 33/40 |
| 2017/0122229 | A1 * | 5/2017 | Ossareh | F02D 11/02 |
| 2018/0058287 | A1 * | 3/2018 | Zhang | F01N 3/2006 |
| 2019/0285017 | A1 * | 9/2019 | Dudar | F02D 41/064 |
| 2021/0355862 | A1 * | 11/2021 | Tufail | F01N 3/2026 |
| 2023/0193840 | A1 * | 6/2023 | Dillen | F02M 21/0293 123/439 |

* cited by examiner

*Primary Examiner* — Logan M Kraft
*Assistant Examiner* — Johnny H Hoang
(74) *Attorney, Agent, or Firm* — Jeremy J. Klobucar

(57) ABSTRACT

An engine system that delivers torque to a driveline of a vehicle includes an internal combustion engine (ICE), a manifold, a compressor and a controller. The manifold selectively communicates air into the ICE. The compressor is driven by an electric motor and is configured to deliver air toward and away from the manifold. The controller determines an ICE start request and, based on the ICE start request, sends a signal to the electric motor to rotate the compressor in a direction that moves air out of the manifold. The eCompressor is used to deplete air in the manifold before starting the ICE. As a result, a reduction in fuel used and therefore a reduction in emissions at startup is achieved.

10 Claims, 3 Drawing Sheets

ELECTRONIC COMPRESSOR FOR REDUCTION OF COLD START EMISSION AND NOISE VIBRATION AND HARSHNESS

FIELD

The present application generally relates to cold start emissions of internal combustion engines and, more particularly, to a system and method to reduce cold start emissions as well as noise, vibration and harshness.

BACKGROUND

The majority of emissions are produced during cold start of an internal combustion engine (ICE) where the catalyst has yet to reach preferred operating temperature. Airflow rate of the ICE during a cold start in both conventional and hybrid start is more than what is needed because the manifold pressure is at ambient pressure at the initial start. More airflow corresponds to more fuel being burned and hence more emissions being created. Further, excess airflow also causes higher noise vibration and harshness (NVH) to be created in the powertrain and experienced by the driver.

Existing solutions to reduce emissions at during a cold start-up of and ICE can incorporate variable lift camshafts with small lift to reduce the amount of airflow going into the cylinder. In general, such technology and implementation is expensive. Accordingly, while some cold start emissions systems do work well for their intended purpose, there exists an opportunity for improvement in the relevant art.

SUMMARY

According to one example aspect of the invention, an engine system that delivers torque to a driveline of a vehicle includes an internal combustion engine (ICE), a manifold, a compressor and a controller. The manifold selectively communicates air into the ICE. The compressor is driven by an electric motor and is configured to deliver air toward and away from the manifold. The controller determines an ICE start request and, based on the ICE start request, sends a signal to the electric motor to rotate the compressor in a direction that moves air out of the manifold.

In some implementations, the controller is further configured to receive a signal from a manifold pressure sensor indicative of a measured pressure in the manifold. The controller is further configured to determine whether the manifold pressure has reached a threshold pressure and stop rotation of the compressor based on reaching the threshold pressure.

According to another example aspect of the invention, the engine system further comprises a throttle that moves between an open position that allows air to be directed into and out of the manifold, and a closed position that inhibits air from being directed into and out of the manifold.

In some implementations, the controller is further configured to send a signal to the throttle, based on the ICE start request, to move the throttle to the open position.

In other implementations, the controller is further configured to send a signal to the throttle, based on reaching the threshold pressure, to close the throttle.

In additional implementations, the controller is further configured to send a signal to the ICE to crank the ICE, subsequent to closing the throttle.

In other implementations, the engine system further comprises a turbine, wherein the electric motor rotates a shaft associated with the compressor and the turbine.

In examples, the electric motor and the compressor comprise an electric compressor.

A method of operating an engine system that delivers torque to a driveline of a vehicle is provided. A start request in an engine system having an internal combustion engine (ICE) is received. A signal is sent, based on receiving the start request, to an electric motor to rotate a compressor to move air in a direction out of the manifold. A signal is received from a manifold air pressure (MAP) sensor indicative of a measured pressure in the manifold. A determination is made whether the measured pressure in the manifold satisfies a threshold, the threshold corresponding to a reduced pressure in the manifold suitable to reduce emissions at startup of the ICE. A signal is sent to the electric motor to stop rotating the compressor based on the measured pressure satisfying the threshold. A signal is sent, based on the measured pressure satisfying the threshold, to the engine system to crank the ICE.

In additional arrangements, a signal is sent to a throttle, based on receiving the start request, causing the throttle to move to an open position that allows air to move into and out of the manifold.

According to another example aspect of the invention, a signal is sent to the throttle, based on reaching the threshold pressure, to close the throttle.

In some implementations, sending a signal to an electric motor to rotate a compressor comprises rotating a shaft with the electric motor causing the compressor to rotate.

In other implementations, sending a signal to an electric motor to rotate a compressor to move air in a direction out of the manifold comprises moving air from the manifold to atmosphere.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As previously discussed, there exists an opportunity for improvement in the art of cold start emissions of internal combustion engines. As is known, the majority of emissions are produced during cold start of an ICE where the catalyst has yet to reach preferred operating temperatures. The airflow rate of the ICE during a start in both conventional and hybrid start is more than what is needed because the manifold pressure is at ambient pressure at the initial start. More airflow corresponds to more fuel being burned and therefore more unwanted emissions. Further, excess airflow also causes higher noise vibration and harshness.

The present disclosure provides an engine system that incorporates an eCompressor that is used to deplete the manifold before starting the ICE. When an engine start is requested, and before cranking, the eCompressor is rotated in an opposite direction of its normal working direction using an electric motor of the eCompressor. Such action results in a vacuum pump drawing the air out of the manifold to the atmosphere. In order to reduce the pumping effort by the eCompressor, the throttle is kept fully open during the flushing operation. The amount of air drawn out is monitored using a manifold pressure sensor. Once the manifold pressure reaches a desired threshold, the throttle is closed completely to stop the air leaking back into the manifold and the eCompressor is turned off or brought back to zero revolutions. Thereafter, normal cranking sequence of the ICE starts. Because of the reduction of air in the manifold, less fuel is used and therefore less emissions are created.

Figure 1:
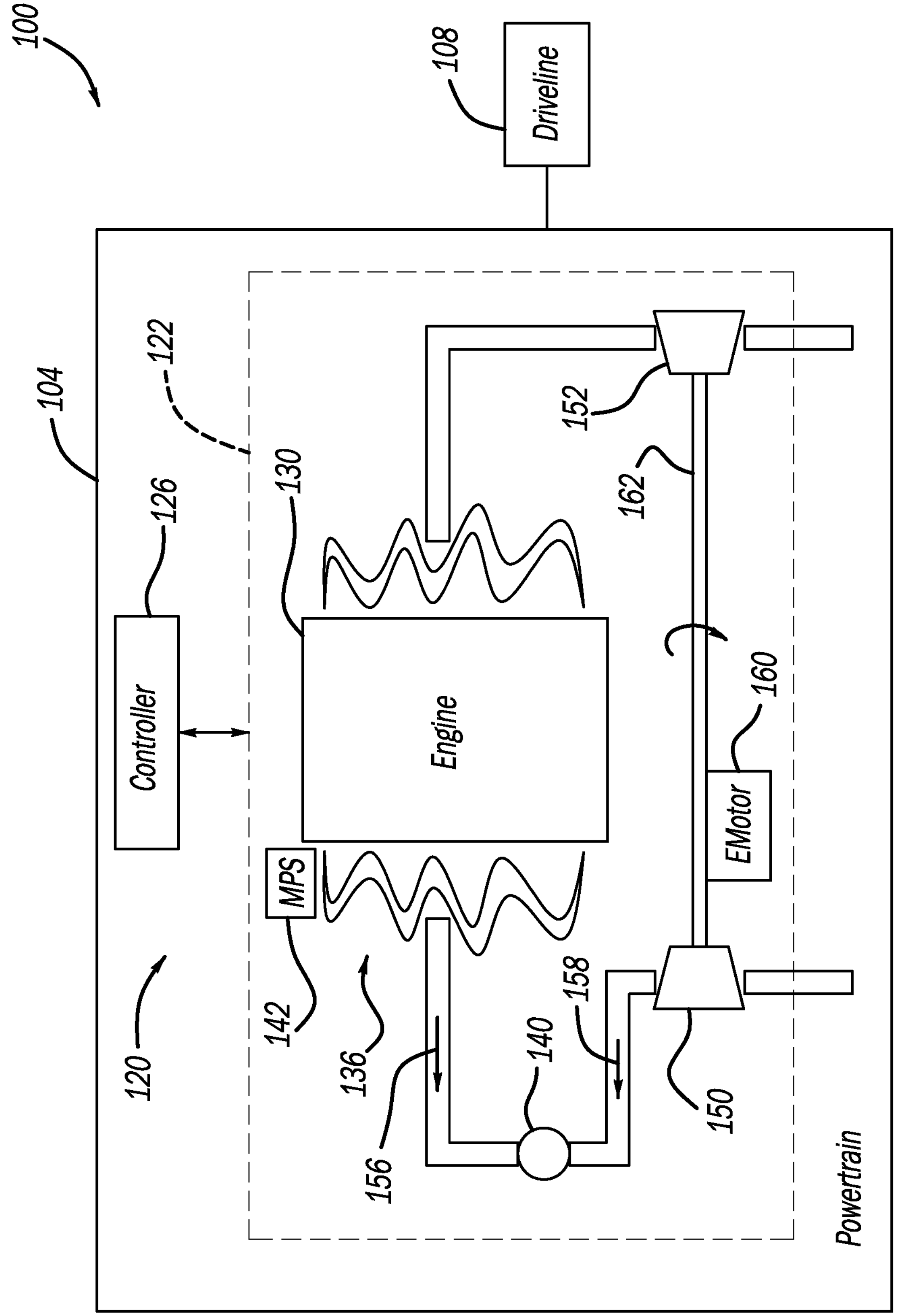
FIG. 1 is a functional block diagram of an engine system including an electronic compressor (hereinafter "eCompressor") that depletes the manifold before starting the ICE according to the principles of the present application.

Referring now to FIG. 1, afunctional block diagram of an example vehicle 100 according to the principles of the present application is illustrated. The vehicle 100 includes powertrain 104 configured to generate and transfer drive torque to a driveline 108 of the vehicle 100 for propulsion. The powertrain 104 generally comprises an engine system 120 including an engine assembly 122 and a controller 126. The engine assembly 122 includes an ICE 130 having a manifold 136 that selectively communicates air to the ICE 130. A throttle 140 actuates between open, closed and intermediate positions to alter an air amount into the manifold 136. A manifold pressure sensor 142 can measure a pressure of the manifold 136 and communicate a signal to the controller 126 indicative of the measured pressure. The engine assembly 122 further includes a compressor 150, a turbine 152 and an electric motor 160. The electric motor 160 rotates a shaft 162 that in turn rotates the compressor 150 and/or the turbine 152.

It will be appreciated that while the example shown includes a turbine 152, the engine system 120 can be configured without the turbine 152 using only a compressor 150 driven by an electric motor, such as the electric motor 160. It will further be appreciated that while the engine system 120 is shown having only the ICE, the engine system 120 can also be configured as a hybrid powertrain having one or more electric propulsion motors.

During operation of the engine system 122, the controller 126 sends a signal to the compressor 150 to operate the compressor 150 in a reverse direction causing air in the manifold 136 to be flushed out of the manifold 136 in the direction indicated by arrow 156. During normal engine use, the compressor 150 typically operates in a direction to direct air into the manifold (represented by arrow 158) by rotating the shaft 162 in a first direction. In the method of the instant disclosure, the controller 126 sends a signal to the compressor 150 to rotate in a second direction, opposite the first direction, to remove air from the manifold 136 (as indicated by arrow 156).

Figure 2:
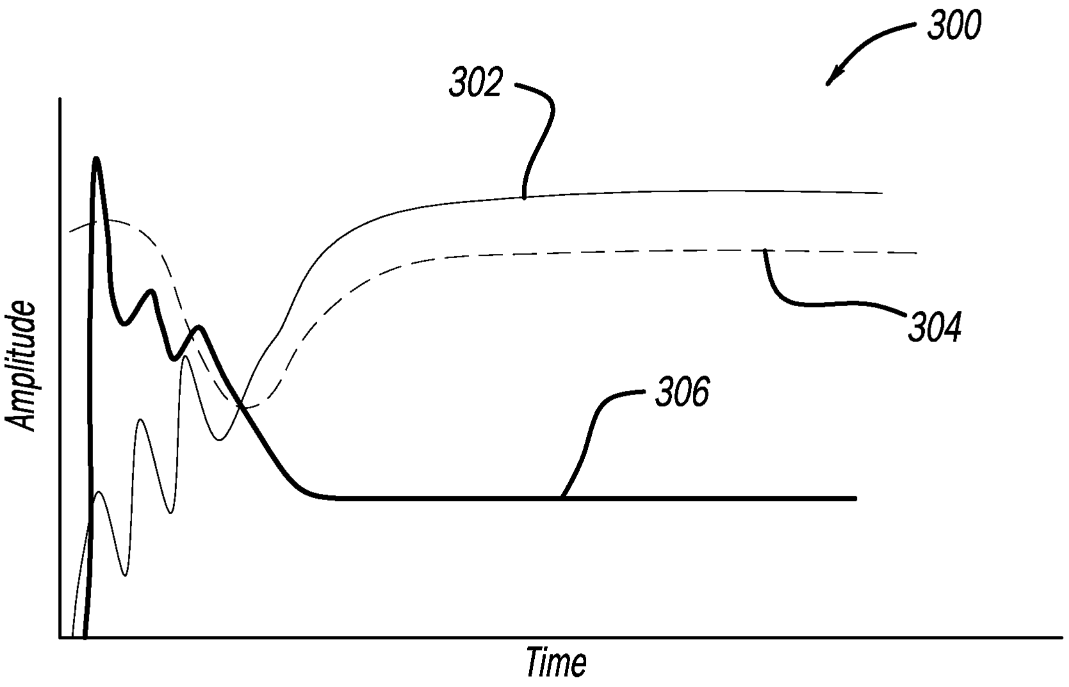
FIG. 2 Prior Art
FIG. 2 is a plot illustrating engine speed, manifold air pressure (MAP) and airflow rate for a conventional ICE at startup according to Prior Art.

Turning now to FIG. 2, a plot 300 illustrating engine speed 302, manifold air pressure (MAP) 304 and airflow rate 306 for a conventional ICE at startup according to Prior Art is shown. As shown, with MAP 304 elevated at startup, airflow rate 306 too is elevated resulting in additional fuel requested at the ICE and excess emissions being created (due to the catalyst not adequately heated up yet). Additionally, engine start experienced at the ICE can be rough adding to unwanted NVH.

Figure 3:
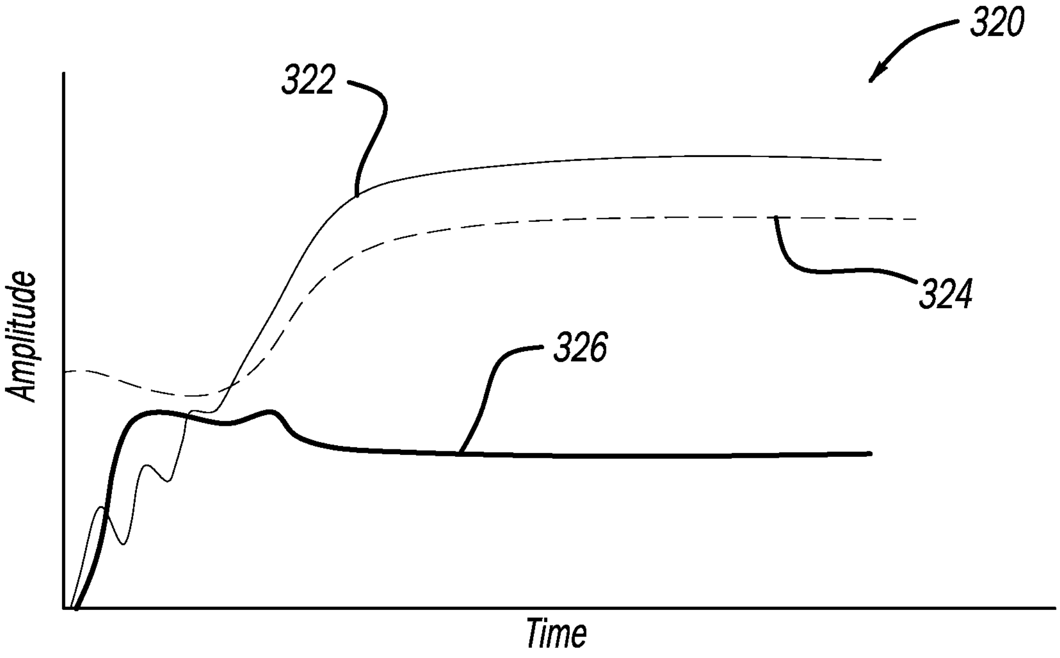
FIG. 3 is a plot illustrating engine speed, manifold air pressure (MAP) and airflow rate for the engine system of FIG. 1 according to the principles of the present application.

With reference to FIG. 3, a plot 320 illustrating engine speed 322, manifold air pressure (MAP) 324 and airflow rate 326 for the engine system 120 according to the principles of the present application is shown. As illustrated, with decreased MAP 324 at startup, a decrease in airflow rate 326 exists. With decreased airflow, decreased fuel is needed and therefore decreased emissions is achieved. Moreover, a smoother start is experienced at the ICE 130 due to a reduced and consistent engine speed 322.

Figure 4:
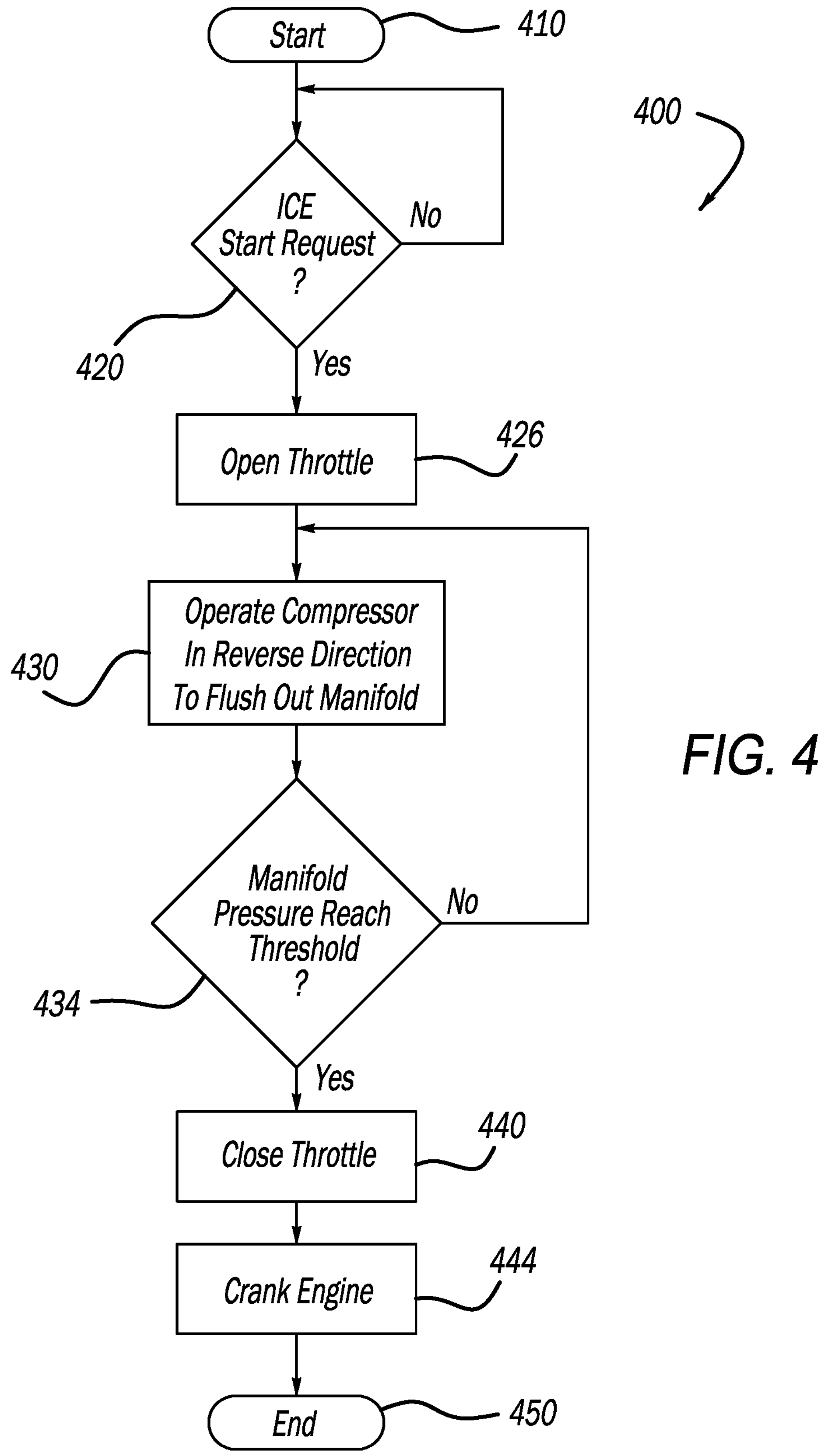
FIG. 4 is a flow chart illustrating a method of operating the engine system of FIG. 1 according to principles of the present application.

With additional reference now to FIG. 4, a method 400 of controlling the engine system 120 according to examples of the present disclosure will be described. The method starts at 410. At 420 control determines whether there has been a key on event. If no key on event has been detected, control loops to 420. If control determines that a key on (or ICE start request) event has been detected, control sends a signal to the throttle 140 to open at 426. At 430, control operates the compressor 150 in a reverse direction (causing air to flow in the direction 156) to flush out the air in the manifold 136. It is appreciated that the compressor 150 operates in a normal direction to direct air into the manifold (causing air to flow in the direction 158) by rotating the shaft 162 in a first direction. In the method 400, control sends a signal to the compressor 150 to rotate in a second direction, opposite the first direction, to remove air from the manifold 136.

At 434, control determines whether the pressure in the manifold 136 has reached a threshold. In examples, the controller 126 can receive a pressure signal from the MPS 142. The threshold can be set to any pressure indicative of a sufficient minimum pressure to satisfy a reduction in emissions. If control determines that the pressure in the manifold 136 has not reached a threshold at 434, control loops to 430. If control determines that the pressure in the manifold 136 has reached the threshold at 434, control closes the throttle 140 at 440. At 444 control cranks the ICE 130. Control ends at 450.

In advantages, the vehicle 100 that incorporates the present engine system 120, achieves a decrease in emissions and NVH by depleting the manifold 136 whereas strategies that require variable cams create a restriction to allow less air into the cylinders of the ICE. An eCompressor is usually used to improve the transient response of turbocharged engines. A significant advantage in the present disclosure is that a vehicle that already uses an eCompressor, there is no extra hardware needed. Instead, the controller 126 is used to operate the eCompressor as needed gaining a significant cost benefit as compared to current solutions.

As used herein, the term controller or module refers to an application specific integrated circuit (ASIC), an electronic circuit, a processor (shared, dedicated, or group) and memory that executes one or more software or firmware programs, a combinational logic circuit, and/or other suitable components that provide the described functionality.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above.

It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. An engine system that delivers torque to a driveline of a vehicle, the engine system comprising:

an internal combustion engine (ICE);

a manifold that selectively communicates air into the ICE;

a throttle that moves between an open position that allows air to be directed into and out of the manifold, and a closed position that inhibits air from being directed into and out of the manifold;

a compressor driven by an electric motor, the compressor configured to deliver air toward and away from the manifold; and a controller that:

determines an ICE start request and, based on the ICE start request, sends a signal to the electric motor to rotate the compressor in a direction that moves air out of the manifold;

receives a signal from a manifold pressure sensor indicative of a measured pressure in the manifold;

determines whether the manifold pressure has reached a threshold pressure suitable to reduce emissions at startup of the ICE;

commands the throttle to be moved to the closed position and stops rotation of the compressor based on the manifold pressure reaching the threshold pressure; and based on the manifold pressure reaching the threshold pressure subsequent to rotating the compressor in a direction that moves air out of the manifold, commands the engine to crank.

2. The engine system of claim 1 wherein the controller is further configured to send a signal to the throttle, based on the ICE start request, to move the throttle to the open position.

3. The engine system of claim 2 wherein the controller is further configured to send a signal to the throttle, based on reaching the threshold pressure, to close the throttle.

4. The engine system of claim 3 wherein the controller is further configured to send a signal to the ICE to crank the ICE, subsequent to closing the throttle.

5. The engine system of claim 1, further comprising a turbine, wherein the electric motor rotates a shaft associated with the compressor and the turbine.

6. The engine system of claim 1 wherein the electric motor and the compressor comprise an electric compressor.

7. A method of operating an engine system that delivers torque to a driveline of a vehicle, the method comprising:

receiving a start request in an engine system having an internal combustion engine (ICE);

sending a signal, based on receiving the start request, to an electric motor to rotate a compressor to move air in a direction out of the manifold;

receiving a signal from a manifold air pressure (MAP) sensor indicative of a measured pressure in the manifold;

determining whether the measured pressure in the manifold satisfies a threshold, the threshold corresponding to a reduced pressure in the manifold suitable to reduce emissions at startup of the ICE;

sending a signal to (i) the electric motor to stop rotating the compressor and (ii) to a throttle that allows air to be directed into and out of the manifold to close the throttle based on the measured pressure satisfying the threshold; and sending a signal, based on the measured pressure satisfying the threshold and subsequent to rotating the compressor in a direction that moves air out of the manifold, to the engine system to crank the ICE.

8. The method of claim 7, further comprising:

sending a signal to the throttle, based on receiving the start request, causing the throttle to move to an open position that allows air to move into and out of the manifold.

9. The method of claim 7 wherein sending a signal to an electric motor to rotate a compressor comprises rotating a shaft with the electric motor causing the compressor to rotate.

10. The method of claim 7 wherein sending a signal to an electric motor to rotate a compressor to move air in a direction out of the manifold comprises moving air from the manifold to atmosphere.

* * * * *